(12) United States Patent
Raynham et al.

(10) Patent No.: US 7,409,531 B1
(45) Date of Patent: Aug. 5, 2008

(54) INTEGRATED MICRO-CONTROLLER AND PROGRAMMABLE DEVICE

(75) Inventors: Michael B. Raynham, Los Gatos, CA (US); Myron R. Tuttle, Santa Clara, CA (US); Minh Nguyen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,192

(22) Filed: Oct. 29, 1999

(51) Int. Cl.
*G06F 9/22* (2006.01)
(52) U.S. Cl. .............................. 712/37; 712/38; 712/39
(58) Field of Classification Search ............... 712/36–39
See application file for complete search history.

(56) References Cited

U.S. PATENT DOCUMENTS 5,382,891 A * 1/1995 Huffener .................... 318/269
5,953,684 A * 9/1999 Alexander .................. 702/108
6,047,198 A * 4/2000 Sudo .......................... 455/414

FOREIGN PATENT DOCUMENTS

EP 419105 A2 * 3/1991

OTHER PUBLICATIONS

Ian Page, "The HARP Reconfigurable Computing System," Oct. 1994, Oxford University Hardware Compilation Group, pp. 1-7.*
Bryan Pfaffenberger, Ph.D., "Que's Computer User's Dictionary," 1994, Que Corporation, 5th Ed., p. 416.*
Page, Ian, Reconfigurable Processors, Apr. 1995, Oxford University Hardware Compilation Group Invited Keynote Address for Heathrow PLD Conference, pp. 1-8.*
Wirthlin, Michael J., et al., The Nano Processor: a Low Resource Reconfigurable Processor, Apr. 11, 1994, pp. 1-9.*

* cited by examiner

*Primary Examiner*—Tonia L M Dollinger (57) ABSTRACT

A single-IC subsystem controller for controlling electronic devices and subsystems within computer systems and other large electronic systems. The single-IC subsystem controller includes a micro-controller, a complex programmable logic device, an EEPROM, an SRAM, and various electronic bus interfaces and additional signal long interfaces for interfacing the single-IC subsystem controller device to electronic devices and electrical components. The single-IC subsystem controller allows for flexible partitioning of control functionality between hardware circuits programmed into the CPLD and software routines executed by the micro-controller.

10 Claims, 6 Drawing Sheets

INTEGRATED MICRO-CONTROLLER AND PROGRAMMABLE DEVICE

TECHNICAL FIELD

The present invention relates to the design and implementation of subsystem controllers and, in particular, to the incorporation of both a micro-controller and a complex programmable logic device together within a single integrated circuit that can be programmed for a wide variety of subsystem controller applications.

BACKGROUND OF THE INVENTION

Subsystem controllers are ubiquitous components of modern computer systems, peripheral devices within computer systems, and other electronic devices. The term "subsystem controller" generally refers to a subcomponent of a more complex electronic system, such as a computer, that comprises logic circuits, a programmable logic device, and a general-purpose micro-controller that executes a number of software routines. A subsystem controller is generally dedicated to one or a small number of specific control tasks. For example, the control of LED and LCD display devices incorporated in a front panel display of a computer system is generally carried out by one or more subsystem controllers. Use of subsystem controllers may offload computationally intensive and time-intensive tasks from the main processor or processors of computer systems, and may significantly decrease data traffic on critical busses of the computer system that are bottlenecks for data movement within the computer system.

Figure 1:
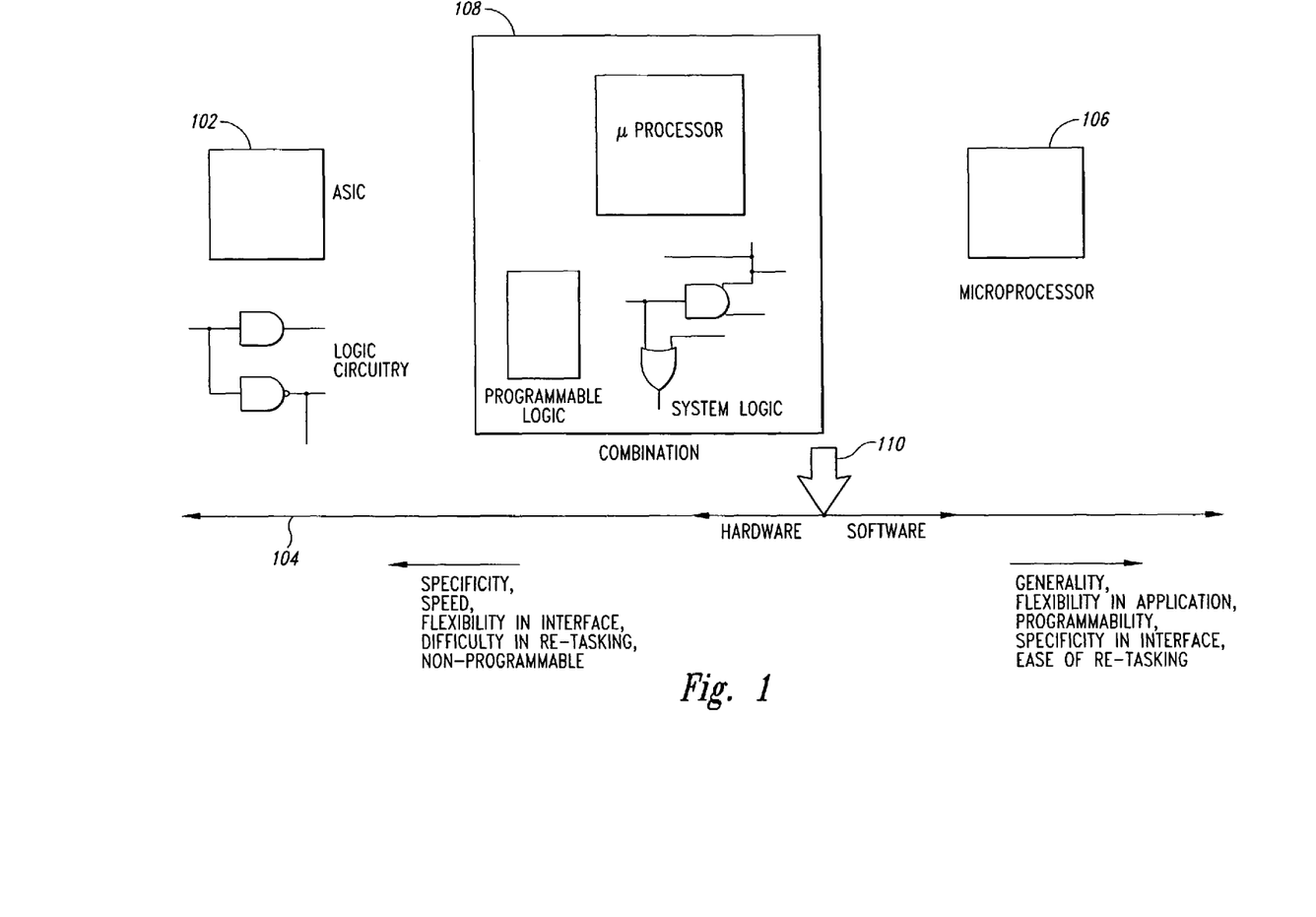
FIG. 1 graphically illustrates a continuum of possible partitioning of functionality between hardware and software.

Within a subsystem controller, control functionality is partitioned between logic circuits, including one or more programmable logic arrays ("PLAs") or programmable logic devices ("PLDs"), and software routines stored in an electronic memory and executed by a micro-controller. FIG. 1 graphically illustrates a continuum of possible partitionings of functionality between hardware and software. In general, the control functionality of a subsystem controller can be entirely implemented in hardware, for example as an application specific integrated circuit ("ASIC"), as indicated in FIG. 1 by the ASIC and logic circuitry 102 at the left end of a line 104 representing a continuum of possible hardware/software partitionings within a subsystem controller. On the other hand, the control functionality within a subsystem controller may also be entirely implemented as software routines running on a micro-controller, as indicated in FIG. 1 by the micro-processor 106 at the right side of the continuum. Normally, control functionality is partitioned between hardware and software, as indicated by the subsystem controller 108 positioned towards the center of the continuum. For any specific subsystem controller, a decision is normally made as to the partitioning, and appropriate components are selected and together integrated on a printed circuit board ("PCB").

Once the partitioning of control functionality between hardware and software has been determined and the components selected and integrated together on a PCB, the partitioning is fixed, as indicated in FIG. 1 by the arrow 110 pointing to a particular partitioning between hardware and software. In order to change a partitioning of functionality, the logic circuits need to be redesigned and re-implemented, different logic may need to be programmed into a programmable logic device, and different software routines may need to be rewritten for execution on the micro-controller. Such re-implementation may require erasing and burning in new or revised code into a read-only memory, replacement of logic circuits with new logic circuits, and, possibly, replacing major components of the subsystem controller. In general, therefore, once designed and implemented, the control functionality embedded within subsystem controllers cannot be economically repartitioned between hardware and software, nor can the subsystem controller be easily re-tasked, or reprogrammed, for new applications.

A hardware-only implementation of the control functionality of a subsystem controller, represented by the left-hand side of the continuum in FIG. 1, may operate far more efficiently than a hardware and software, or software-only implementation. In general, dedicated circuitry is faster and may be more power-efficient than software routines fetched from a memory device into a general micro-controller and executed by the micro-controller. However, hardware-only implementations are extremely specific for a given application. Moreover, when the control tasks are complex, the design effort required for a hardware device may be formidable, and the circuitry required may be too large to be implemented by programming a single programmable logic device. On the other hand, software-only implementations are easily directed towards a variety of different applications by creating and loading different software routines in system controllers. Software routines are often easier to implement and easier to test and debug than hardware implementations. However, for low-level control of electronic devices, software only running on a general microprocessor may be quite inefficient, requiring extensive polling of various signal line and register states and tedious attention to the time sequence of state changes within one or more electronic devices. Furthermore, the electrical interface to micro-controllers may be largely standardized and therefore rather inflexible. For these reasons, compromise hardware and software implementations, as depicted in FIG. 1 by the subsystem controller 108 towards the center of the continuum 104, are generally selected. The low-level tasks for which hardware implementations are most efficient and particularly well-suited are implemented in logic circuits and programmable logic devices, and higher-level, more complex, decision-based logic is implemented in software routines. While compromise hardware and software solutions provide a certain amount of flexibility, in that different software routines may be loaded and executed by the micro-controller, the compromise hardware and software solutions are nonetheless very specifically tailored towards particular electrical interfaces and types of control functionalities.

The development costs for developing a subsystem controller for a specific application may be relatively high when compared to the volume of production of the subsystem controller. The development costs for the subsystem controller include the costs for designing and for implementing logic circuitry, programming programmable logic devices, and developing software routines, but also includes significant expense and time in testing the design and implementation of the subsystem controller and for insuring quality and reliability of the subsystem controller during the manufacturing process. The cost of quality control during the manufacturing process is related to the number of different components that must be integrated together and interconnected within the subsystem controller. When problems are identified after design and manufacture, fixes may require costly redesign, re-implementation, and retesting of the subsystem controller.

The reliability and flexibility in application of subsystem controllers may often be related to the power consumption of a subsystem controller. Current subsystem controllers often employ system logic devices that use CMOS integrated low-power logic. Unfortunately, CMOS logic devices usually cannot be reprogrammed, and usually have limited memory capacity. Alternatively, current subsystem controllers may employ higher-power PLA devices which can be reprogrammed, but which also suffer memory size constraints.

Designers and manufacturers of subsystem controllers have therefore recognized a need for a versatile, low-cost, easily programmable, and energy-efficient subsystem controller device that can be programmed for a variety of different applications. A versatile subsystem controller device could be manufactured in high volume, thus decreasing design and implementation costs associated with low-volume single-application subsystem controllers. Furthermore, a versatile, easily programmable subsystem controller devices would allow for hardware standardization and decreased overall system design costs, while still allowing manufacturers to include proprietary control functionality within the subsystem controller device via proprietary programmable logic device programming and via proprietary software routines for execution on a micro-controller.

SUMMARY OF THE INVENTION

One embodiment of the present invention is a single integrated circuit ("IC") comprising a micro-controller, an erasable electronic programmable read-only memory ("EEPROM"), a static random-access memory ("SRAM"), a complex programmable logic device ("CPLD"), and a programming interface bus. The externally accessible interface bus allows both the CPLD and the micro-controller to be easily programmed or reprogrammed. The single IC subsystem controller device that represents one embodiment of the present invention is a low-power, reliable hardware component that can be manufactured in high volumes and programmed for a variety of different applications. The software can be reloaded, after manufacture and installation, in order to fix bugs or provide added or different functionality. An almost limitless number of partitionings of control functionality between hardware and software are available within the single IC subsystem controller device. Circuit-level logic can be implemented through programming of the CPLD to handle low-level control functions most efficiently implemented at the hardware level. Software routines can be stored in the EEPROM or downloaded into the SRAM, for execution by the micro-controller, to implement more complex, higher-level, decision-based logic most easily and efficiently implemented in software. The single IC subsystem controller device can be manufactured in high volume as a standard component, but may be programmed to contain proprietary logic circuitry and may be loaded with proprietary software modules.

DETAILED DESCRIPTION OF THE INVENTION

One embodiment of the present invention provides a single IC that can be programmed to serve as a subsystem controller for controlling a liquid crystal display ("LCD") device, included on the front panel of a server computer, that displays information about the components and state of the server computer. The single-IC subsystem controller device includes a micro-controller, a complex programmable logic device ("CPLD"), an EEPROM, an SRAM, and various bus interfaces and control lines for interfacing the single IC to other components of the server computer. Low-level control functionality for the subsystem controller is implemented as logic circuits by programming the CPLD, while higher-level control logic is implemented in software routines that are executed by the micro-controller. The single-IC device can be manufactured in high volume for relatively lost cost, and can then be programmed for a variety of different applications, including the LCD controller application described below.

Figure 2:
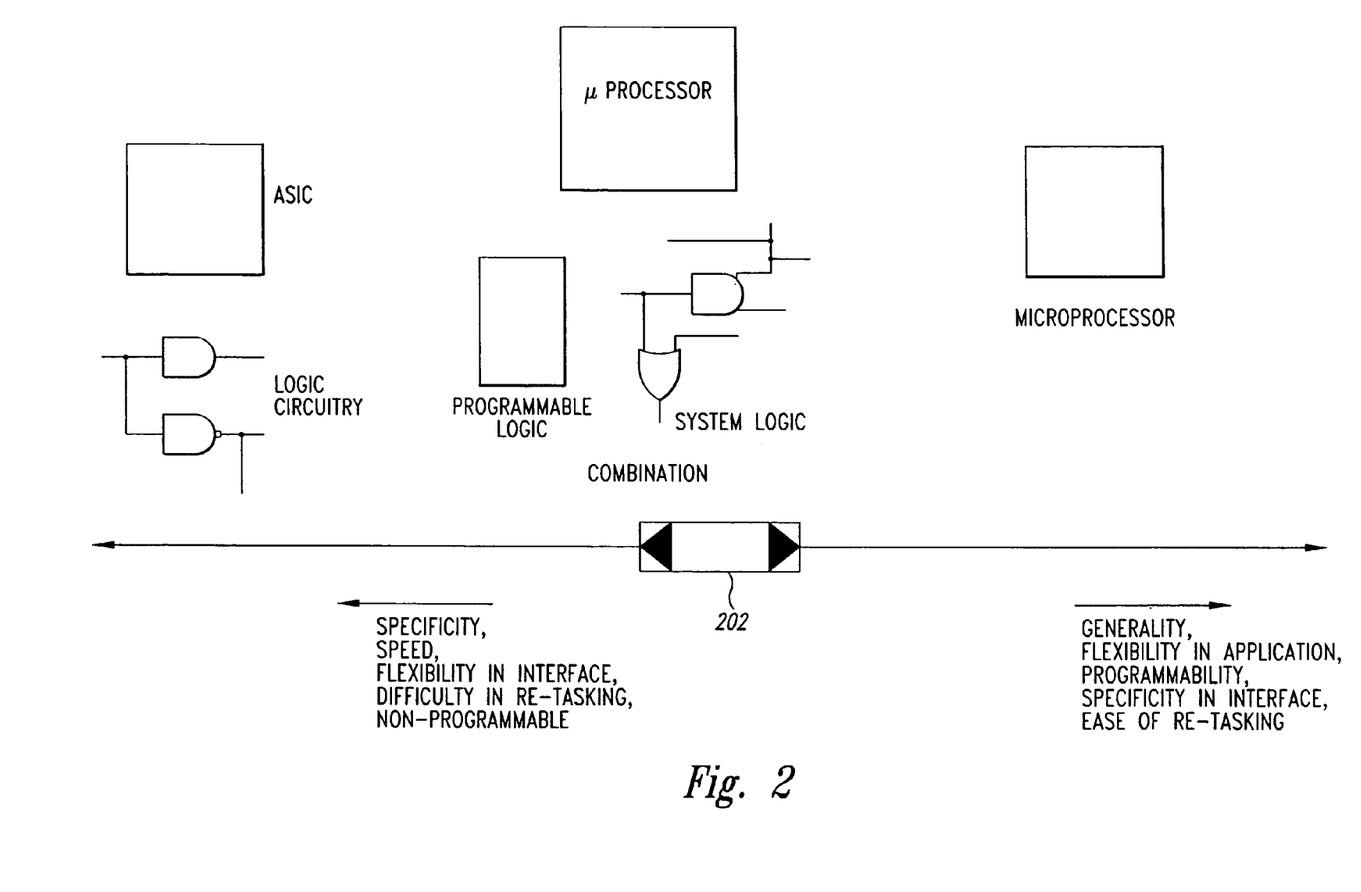
FIG. 2 graphically illustrates the flexibility in partitioning control functionality between hardware and software in a single-IC subsystem controller device.

FIG. 2 graphically illustrates the flexibility in partitioning control functionality between hardware and software in the single-IC subsystem controller device that represents one embodiment of the present invention. FIG. 2 is nearly identical to FIG. 1, with exception that the fixed arrow (100 in FIG. 1) has been replaced by a slidable partition 202. Using the single-IC subsystem controller device of the present invention, the manufacturer of various subsystem controllers can choose arbitrary partitionings of control functionality between hardware and software. Thus, the partitioning is not fixed, as in previous subsystem controllers, but is flexible. The flexibility arises from the ability to program both the CPLD and the micro-controller in the single-IC subsystem device. For example, in an application where only extremely efficient, low-level logic functional control is needed, the entire control functionality may be implemented by programming the CPLD of the single-IC subsystem controller device. In such an application, there is no need for executing software routines on the micro-controller. For another application in which only high-level, complex logic is required, and there is little or no requirement for time-critical and time-intensive interfacing to an electric device at the circuit level, the entire control functionality may be implemented as a collection of software routines stored in the EEPROM or downloaded into the SRAM and executed by the micro-controller. In between the two extremes are an almost limitless number of different control functionality partitionings between hardware and software available to the subsystem controller designer and manufacturer of the single-IC subsystem controller device.

Figure 3:
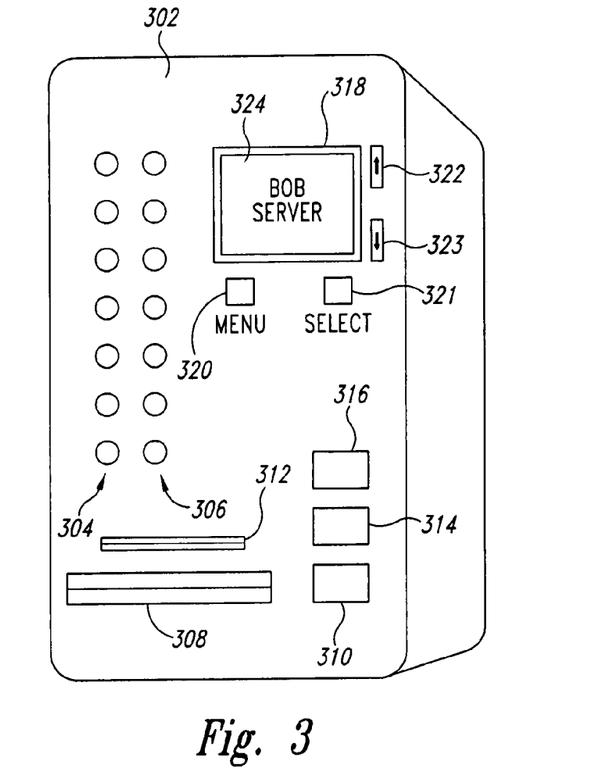
FIG. 3 shows a hypothetical external front panel of a server computer.

FIG. 3 shows a hypothetical external front panel for a server computer. The front panel 302 includes 2 columns of LEDs 304 and 306, a CD ROM drive 308, a pushbutton 310 to operate the CD ROM drive, a removable disk drive 312, a pushbutton 314 to operate the removable disk drive, and a poweron/poweroff pushbutton 316. In addition, the upper right-hand corner of the front panel contains an LCD display window 318 along with 4 pushbuttons 320-323 that control operation of the LCD display window. In general, when an operator is not controlling the LCD display 318 through operation of the pushbuttons 320-323, the LCD display window displays an alphanumeric character string representing a user-defined server ID, in FIG. 3 the server ID "Bob Server" 324.

Figure 4:
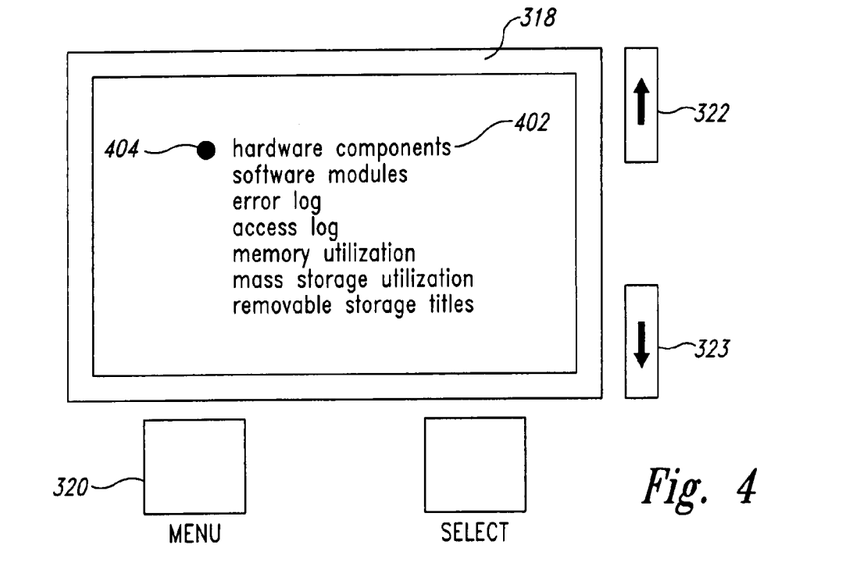
FIG. 4 shows a menu displayed in an LCD display window of the hypothetical external front panel shown in FIG. 3.
Figure 5:
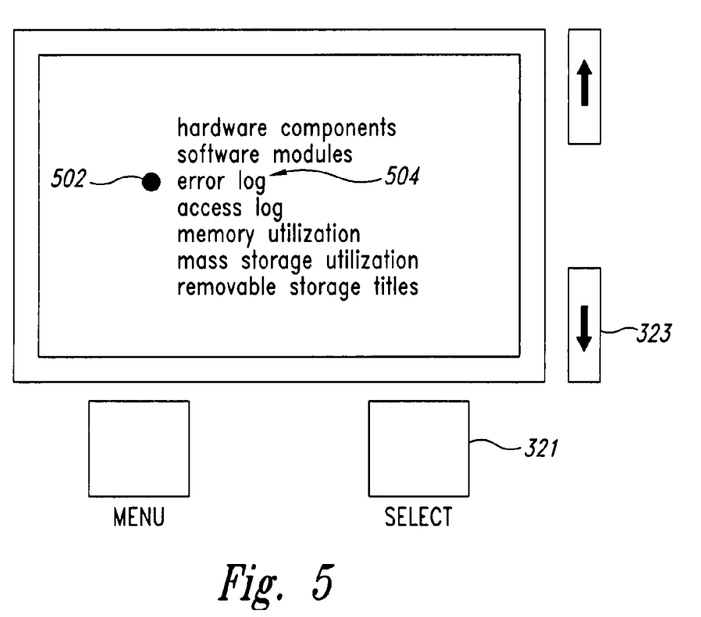
FIG. 5 shows the contents of the LCD display window following depression of the down-arrow pushbutton 324 twice by an operator.
Figure 6:
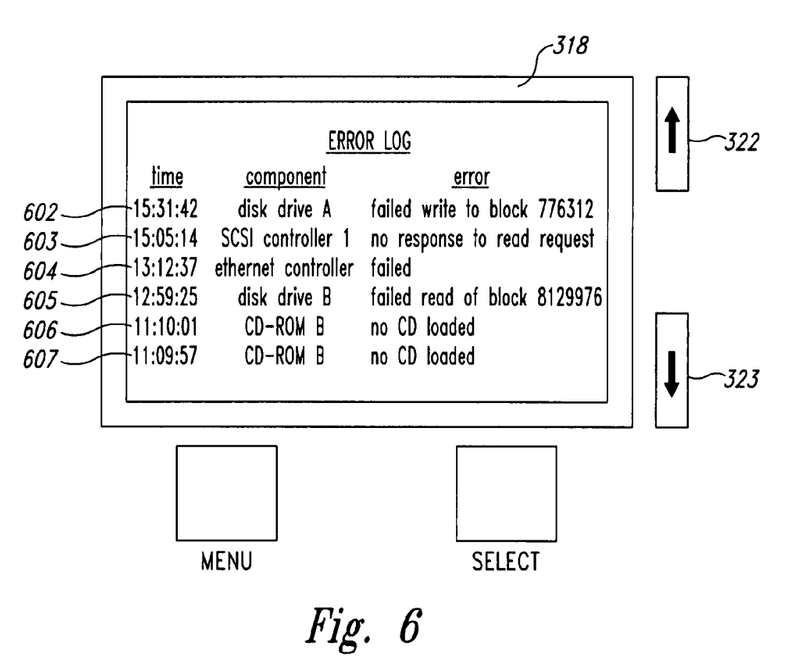
FIG. 6 shows the contents of the LCD display window following operator selection of the information item "error log."

FIGS. 4-6 illustrate operation of the LCD display window located on the hypothetical front display panel of the server computer shown in FIG. 3. Note that, for the sake of clarity and brevity, the numerical labels used to identify the LCD display window and LCD pushbuttons in FIG. 3 are repeated in FIGS. 4-6.

When an operator desires to display various types of system information in the LCD display window 318, the operator depresses the pushbutton 320 labeled "Menu." FIG. 4 shows a menu displayed in the LCD display window resulting from depression of the Menu pushbutton 320. The LCD display window 318 contains a list of various types of system information that may be displayed in the LCD display window. One of the items is highlighted, or marked, for selection. In FIG. 4, the first information item "hardware components" 402 is marked for selection by a large filled circle 404 to the left of this information item.

The operator may move the highlighting, or mark, up and down through the list of information items by using the up-arrow pushbutton 322 and the down-arrow pushbutton 323. FIG. 5 shows the contents of the LCD display window following depression of the down-arrow pushbutton 323 twice by an operator. Note that, in FIG. 5, the selection mark 502 has moved downwards by 2 entries to mark the information item error log 504.

Once the operator has positioned the highlighting, or selection mark, on the information item that the operator desires to display, the operator pushes the pushbutton 321 labeled "Select" to display the selected information. FIG. 6 shows the contents of the LCD display window following operator selection of the information item error log. In FIG. 6, a number of error log entries are listed in rows 602-607. For example, the first error log entry 602 indicates that drive A failed to write block 776312 at 3:31 p.m. The list of error log entries may be quite lengthy, and may therefore not fit within the LCD display window 318. The operator may scroll through all the entries in the error log using the up-arrow pushbutton 322 and the down-arrow pushbutton 323.

The operator may obtain many different types of information via the hypothetical LCD display window 318. In FIG. 4, the menu of information items includes: (1) "hardware components," a detailed list of the hardware components within the server, including serial or revision numbers; (2) "software modules," a list of the major software modules loaded into the server, including revision codes; (3) "error log," a log of system errors that includes the latest errors detected by the operating system of the server computer and stored within a memory device within the server computer, with new errors displacing the oldest stored errors once the memory area devoted to storage of errors is full; (4) "access log," a list of the various remote computers that have recently accessed the server for information; (5) "memory utilization," an indication of the current usage of the various memory components within the server; (6) "mass storage utilization," an indication of the current usage of various mass storage devices within the server; and (7) "removable storage titles," a list of the titles, or identifiers, of any removable storage media currently loaded within the server.

The server front panel display and LCD display window described with reference to FIGS. 3-6 is one example of a system in which the integrated circuit that represents one embodiment of the present invention may be employed. This embodiment of the present invention may be equally advantageously employed for many different varieties and configurations of display panels, including display panels featuring only LED displays, display panels featuring display windows, such as the LCD display window shown in FIG. 3, capable of displaying different types and quantities of information, and display panels that include additional types of display devices and indicators. Moreover, this embodiment of the present invention may be used to control many other types of devices and subsystems. The current example is but one illustration of the possible applications of the present invention.

Figure 7:
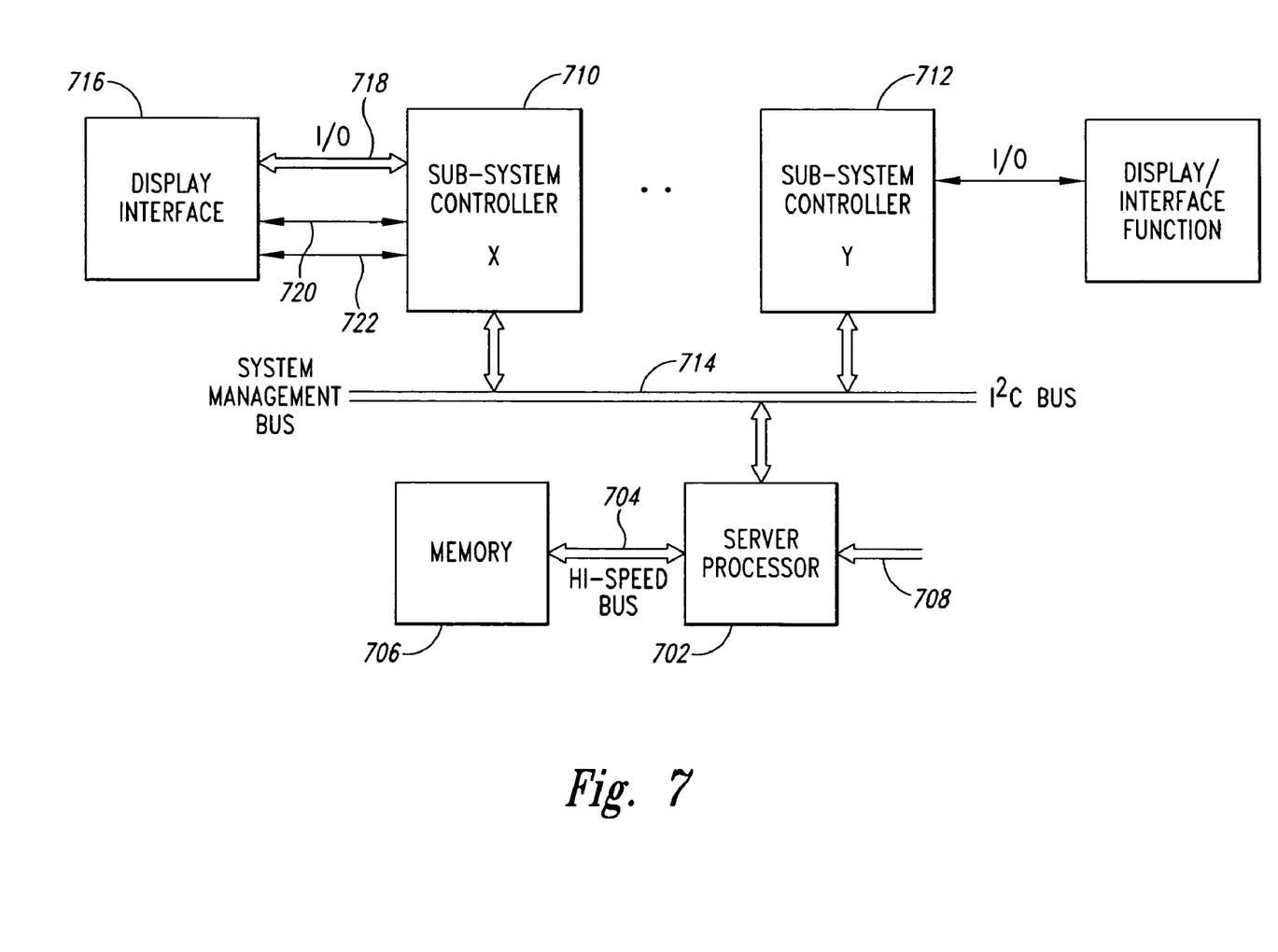
FIG. 7 shows a simple block diagram illustrating the hardware architecture underlying the LCD display described with reference to FIGS. 3-6.

FIG. 7 shows a simple block diagram illustrating the hardware architecture underlying the LCD display described with reference to FIGS. 3-6. In FIG. 7, a server processor 702 is connected via a high-speed bus 704 to a random access memory ("RAM") 706. The server processor 702 may be connected to a number of other components not shown in FIG. 7 via a second high-speed bus 708. The server processor is shown, in FIG. 7, connected to a number of subsystem controllers 710 and 712 via an inter IC ("I²C") bus 714. One subsystem controller 710 controls the LCD display window 716 (318 and 320-323 in FIG. 3), and is interconnected to the LCD display window via an 8-bit input/output ("I/O") bus 718 and various additional signal lines 720 and 722. The subsystem controller may also control the LEDs on the hypothetical front panel of FIG. 3, although only control at the LCD display window is described, in detail, below. The server may contain additional server processors, in addition to server processor 702, and may contain a great many additional components, including additional memory components, mass storage components, communications controllers, I/O device controllers, video display controllers, and many other types of components, all interconnected through a hierarchy of data buses. These additional components, and the various types of architectures that support them, are not relevant to the current example, and are thus not shown in FIG. 7.

A generalized description of the operation of the subsystem controller that controls the LCD display window (318 and 320-323 in FIG. 3) is provided below as a high-level C++-like pseudo-code implementation. This pseudo-code implementation describes internal operation of the subsystem controller 710 as well as the I²C bus 714 interface between the subsystem controller and other components of the server computer, such as the server processor 702, and the interface to the LCD window display 716, including the I/O bus 718 and the additional signal lines 720 and 722. The functionality described in the C++-like pseudo-code implementation may be implemented, in part, in logic circuits or programmable logic devices, and, in part, as a number of software routines that execute on a micro controller. A pseudo-code implementation is used, in the following discussion, in order to illustrate the flexible boundary between the portions of the functionality implemented in hardware and those portions of the functionality implemented in software. As discussed above, and as discussed in more detail below, the integrated circuit embodiment of the present invention allows for an almost limitless number of different apportionings of the control functionality between hardware and software along a continuum starting from a complete hardware implementation and ending with a software implementation running on a general-purpose micro controller.

The C++-like pseudo-code is presented below as 6 class declarations, 3 enumerations, and implementations of a number of member functions. For the most part, member functions in the class declarations will be described textually, rather than through pseudo-code implementations. However, implementations of a number of member functions of the final class are provided to illustrate, in detail, control of the LCD display window to display the menu and a scrollable error log as shown in FIGS. 3-6. Each of the declared classes include a constructor and destructor which will not, in general, be discussed in detail.

The first 2 classes, provided below, describe general functionality used later in the implementations of number functions:

```
1      class ListofStrings
2      {
3          public:
4              String&  getFirst( );
5              String&  getNext( );
6              String&  getNth(int n);
7              int      getNum( );
8              void     addString(char *str);
9              ListofStrings( );
10             ~ListofStrings( );
11     };
12
13     class timer
14     {
15     public:
15         set( );
17         timer(void (*timeOut)( ));
18         ~timer( );
19     };
```

The class "ListofStrings," declared above on lines 1-11, is a string container class. An the instance of this class stores some number of character strings, each of which has a fundamental data type of "String." Member functions of the class "ListofStrings" include: (1) "getFirst," declared above on line 4, a member function that returns the first string stored within an instance of ListofStrings; (2) "getNext," declared above on line 5, a member function that returns a next string stored in the instance of ListofStrings; (3) "getNth," declared above on line 6, a member function that returns the string within the instance of a ListofStrings having an ordinal sequence supplied as argument "n;" (4) "getNum," a member function that returns the number of strings contained in an instance of ListofStrings; and (5) "addString," a member function that receives a pointer to a character string as argument "str" and adds the referenced string to an instance of a ListofStrings.

The class "timer" represents a timing component that can be set to expire after a definite interval of time and that, once expired, calls a call-back function supplied as an argument to the constructor for the class "timer," declared above on line 17. The member function "set," declared above on line 16, sets the timer to run for some definite period of time, after which the timer expires and calls the call-back function supplied to the constructor. A call to the member function "set" prior to expiration of the timer resets the timer to the fixed interval of time.

The class "serverManagement," provided below, represents the interface between the subsystem controller (710 in FIG. 7) and additional server computer components accessible to the subsystem controller via the I²C buss (714 in FIG. 7):

```
1      class serverManagement
2      {
3          String& fetchServerId( );
4          ListofStrings& fetchHardwareComponents( );
5          ListofStrings& fetchSoftwareComponents( );
```

-continued

```
6          ListofStrings& fetchErrorLog( );
7          ListofStrings& fetchAccessLog( );
8          ListofStrings& fetchMemoryUtilization( );
9          ListofStrings& fetchStorageUtilization( );
10         ListofStrings& fetchRemovableStorage( );
11         serverManagement( );
12         ~serverManagement( );
13     };
```

This interface is abstracted at a relatively high level by the class "serverManagement." Basically, various types of information may be downloaded from the I²C buss from various memory components of the server computer, such as RAM memory 706 in FIG. 7. The details of how the information is collected and placed into memory by various components of the server computer is not relevant to the current discussion, and hence only abstractly described by the class "serverManagement." The class "serverManagement" contains the following member functions: (1) "fetchServerID," a member function that returns a character string representation of a user-defined identifier assigned to the server, such as server ID 324 in FIG. 3; (2) "fetchHardwareComponents," a member function that returns a list of strings that together represent a detailed list of the hardware components of the server computer; (3) "fetchSoftwareComponents," a member function that returns a list of strings representing the software components layered within the server computer; (4) "fetchErrorLog," a member function that returns a list of strings representing an extensive log of system errors detected in the server computer; (5) "fetchAccessLog," a member function that returns a list of remote computers recently accessing information on the server computer; (6) "fetchMemoryUtilization," a member function that returns a list of character strings that describe memory utilization within the server computer; (7) "fetchStorageUtilization," a member function that returns a list of strings representing the mass storage device utilization within the server computer; and (8) "fetchRemovableStorage," a member function that returns a list of character strings representing the titles of removable mass storage media loaded within the server computer. Presumably, software routines running on one or more main server processors, such as server processor 702 in FIG. 7, are responsible for collecting the various types of information returned by serverManagement functions and storing that information in memory components within the server computer. Alternatively, other components that include processing capabilities and that are accessible via the I²C bus may compile certain of the information and store it within memory components.

Depression of the pushbuttons associated with the LCD display window (320-323 in FIG. 3) generate interrupts that are handled by software running on the subsystem controller (710 in FIG. 7). The following C++-like enumeration lists the four interrupts that are generated by the menu pushbutton, the select pushbutton, the up-arrow pushbutton, and the down-arrow pushbutton:

enum LCD_INTERRUPT {MENU, SELECT, SCROLL_UP, SCROLL_DOWN};

The class "LCD," provided below, represents the interface to the LCD display window (716, 718, 720 and 722 in FIG. 7):

```
1   class LCD
2   {
3       public:
4       int     getMaxDisplayLines( );
5       void    appendToDisplay (Boolean top, String & str);
6       void    clear( );
7       void    highlight(int line);
8       void    clearHighlight( );
9       int     getNumScrollUps( );
10      int     getNumScrollDowns( );
11      ~LCD    (void (*interruptHandler)(LCD_INTERRUPT));
12      LCD( );
13  };
```

The class "LCD" includes the following member functions: (1) "getMaxDisplayLines," a member function that returns the number of lines of text that can be displayed at one time by the LCD display window; (2) "appendToDisplay," a member function that adds a character string to either the top or the bottom of the LCD display window, automatically scrolling text already displayed by the LCD window downward or upward, respectively, in order to make room for the newly added line of text; the argument "top" indicating whether the new line of text should be appended to the first line of the LCD display window, and the currently displayed lines scrolled downward, or whether the new line should be appended to the bottom line of the LCD window, and currently displayed lines of text scrolled upward; the argument "str" referencing the character string to be appended to the display; (3) "clear," a member function that clears the LCD display window; (4) "highlight," a member function that highlights, or marks, the line of text displayed in the LCD window having the ordinal line number supplied by the argument "line;" (5) "clearHighlight," a member function that removes any highlighting or marking from the LCD display window; (6) "getNumScrollUps," a member function that returns the number of times that the up-arrow pushbutton (322 in FIG. 3) has been depressed since a last interrupt has been handled; (7) "getNumScrollDowns," a member function that returns the number of times the down-arrow pushbutton (323 in FIG. 3) has been depressed since handling of the last interrupt; and (8) a constructor that takes, as its single argument, a pointer to an interrupt routine to be called for handling interrupts generated by operator interaction with the pushbuttons (320-323 in FIG. 3).

The class "localMemory," provided below, represents a local memory component within the subsystem controller (710 in FIG. 7):

```
1   class localMemory
2   {
3       public:
4       void store(ListofStrings & toDisplay);
5       String & getNthString(int n);
6       int getNumStoredStrings( );
7       localMemory( );
8       ~localMemory( );
9   };
```

The class "localMemory" includes the following member functions: (1) "store," declared above on line 4, a member function that takes a list of strings argument "toDisplay" and stores the character strings contained in this list of strings into localMemory; (2) "getNthString," declared above on line 5, a member function that returns the nth character string stored within memory; and (3) "getNumStoredStrings," declared above on line 6, a member function that returns the total number of strings stored within memory.

The software routines running on the subsystem controller (710 in FIG. 7) track the state of the LCD display window. The following C++-like enumeration enumerates the 3 different states of the LCD window:

enum DISPLAY_STATE {SERVER_ID, MENU, MENU_SELECTION};

In the state "SERVER_ID," the LCD is currently displaying the server ID, as in FIG. 3. In the state "MENU," the LCD display window is currently displaying various MENU selections, as in FIGS. 4 and 5. In the state "MENU_SELECTION," the LCD window is currently displaying selected information, such as the display of the error log in FIG. 6.

The following enumeration lists enumerated constants standing for each of the various possible menu items shown in FIGS. 4 and 5:

enum MENU_ITEMS {HARDWARE, SOFTWARE, ERRORS, ACCESS, MEMORY, STORAGE, REMOVABLE_STORAGE};

The class "controller," provided below, represents the control logic that resides in the subsystem controller (710 in FIG. 7) to control display of server IDs, menus, and selected information in the LCD display window:

```
1   class controller
2   {
3       public:
4
5       serverManagement   servMng;
6       LCD                lcd(controller::interruptHandler);
7       localMemory        lMem;
8       ListofStrings      menuStrings;
9       timer              tm(controller::displayServerId);
10      DISPLAY_STATE      dspState;
11      int                highlt;
12      int                top, bottom;
13
14      void interruptHandler(LCD_INTERRUPT intrp);
15      void displayMenu( );
16      void displayServerId( );
17      void displayHardwareComponents( );
18      void displaySoftwareComponents( );
19      void displayErrorLog( );
20      void displayAccessLog( );
21      void displayMemoryUtilization( );
22      void displayStorageUtilization( );
23      void displayRemovableStorage( );
24      void dispatch( );
25      scroll_menu_down( );
26      scroll_screen_down( );
27      scroll_menu_up( );
28      scroll_screen_up( );
29      controller( );
30      ~controller( );
31  };
```

The class "controller" contains the following data members: (1) "servMng," declared above on line 5, an instance of the class "serverManagement," described above; (2) "lcd," declared above on line 6, an instance of the class "LCD," initialized with a pointer to the controller member function "interruptHandler," declared below on line 14; (3) "lMem," declared above on line 7, an instance of the class "localMemory;" (4) "menuStrings," declared above on line 8, an instance of the class "ListofStrings" that stores the menu items displayed in FIGS. 4 and 5; (5) "tm," declared above on line 9, an instance of the class "timer;" (6) "dspState,"

declared above on line 10, a data member that stores the current display state of the LCD display window; (7) "highlt," declared above on line 11, an integer holding the line number of a line currently highlighted, or marked, on the LCD display window; and (8) "top" and "bottom," two integer members that contain the ordinal numbers of the top and bottom lines currently displayed on the LCD display window, where the ordinal numbers refer to the sequence of strings stored with local memory. The class "controller" includes the following member functions: (1) "interruptHandler," declared above on line 14, a member function that represents the interruptHandler that handles interrupts generated by the LCD display window interface (716, 718, 720 and 722 in FIG. 7); (2) "displayMenu," declared above on line 15, a member function that controls display of the menu as shown in FIGS. 4 and 5; (3) "displayServerId," declared above on line 16, a member function that controls display of the server ID by the LCD display window, as shown in FIG. 3; (4)-(11) the member functions "displayHardwareComponents," "displaySoftwareComponents," "displayErrorLog," "displayAccessLog," "displayMemoryUtilization," "displayStorageUtilization," and "displayRemoveableStorage," declared above on lines 16-23, member functions that display the information corresponding to each of the menu items, where member function "displayErrorLog," declared above on line 19, controls display of the error log as shown in FIG. 6; (12) "dispatch," declared above on line 24, an interrupt dispatch routine; (13) "scroll_menu_down," declared above on line 25, a member function that controls scrolling down of the highlighting, or marking, used for selection of menu items; (14) "scroll_screen_down," declared above on line 26, a member function that controls scrolling down of information displayed on the LCD screen, such as the error log displayed in FIG. 6; (15) "scroll_menu_up," declared above on line 27, a member function that controls scrolling of the highlighting, or marking, of a menu item upward on the LCD display device; and (16) "scroll_screen_up," declared above on line 28, a member function that controls scrolling of information displayed on the LCD display device upward, such as the error log information shown in FIG. 6.

Implementations of a number of controller member functions will now be provided in order to illustrate the functionality residing within the subsystem controller (710 in FIG. 7) required to drive display of information by the LCD display window (318 in FIG. 3). As with all pseudo-code examples, there are an almost limitless number of ways in which this functionality can be programmed, and any number of different computer languages may be employed for such implementations. The following implementations are intended to illustrate the concepts necessary to describe the present invention.

The controller member function "interruptHandler," provided below, is the main interrupt handling routing invoked as a result of an operator depressing 1 or more of the pushbuttons (320-323 in FIG. 3) associated with the LCD display window:

```
1    void controller::interruptHandler(LCD_INTERRUPT intrp)
2    {
3        switch (intrp)
4        {
5            case MENU:
6                displayMenu( );
7                break;
8            case SELECT:
9                if (dspState == MENU) dispatch( );
10               break;
```

```
11           case SCROLL_UP:
12               if(dspState == MENU)
13                   scroll_menu_up( );
14               else if (dspState == MENU_SELECTION)
15                   scroll_screen_up( );
16               break;
17           case SCROLL_DOWN:
18               if (dspState == MENU)
19                   scroll_menu_down( );
20               else if (dspState == MENU_SELECTION)
21                   scroll_screen_down( );
22               break;
23           default:
24               break;
25       }
26       tm.set( );
27   }
```

The member function "interruptHandler" receives, as argument "intrp," a numerical code indicating the type of interrupt that has been received. The member function "interruptHandler" is essentially a switch-statement that dispatches control to different routines for handling the different types of interrupts. This switch-statement comprises lines 3-25 in the above pseudo-code. When an interrupt has been handled, interruptHandler calls the timer member function "set," on line 26, in order to reset the timer, so that if another interrupt is not received within a definite interval of time, the timer will expire and call the controller member function "displayServerId" to display an alphanumeric representation of the user-defined server ID in the LCD display window. In the case that interruptHandler receives a MENU interrupt, interruptHandler calls the controller member function "displayMenu" on line 6. In the case that inerruptHandler receives a SELECT interrupt, then if the current state of the LCD display window is "MENU," interruptHandler calls the controller member function "dispatch" on line 9. Otherwise, controls falls through to the timer reset on line 26. Thus, the select pushbutton (321 in FIG. 3) has no effect on the LCD display window unless the LCD display window is currently displaying a menu of choices from which a selection can be made. When interruptHandler receives a SCROLL-UP interrupt, interruptHandler calls the controller member function "scroll_menu_up," on line 13, in the case that the LCD display window is currently displaying a menu, and calls the controller member function "scroll_screen_up," on line 15, in the case that the LCD display window is currently displaying information, such as the error log. When interruptHandler receives a SCROLL-DOWN interrupt, interruptHandler calls the controller member function "scroll_menu_down," on line 19, in the case that the LCD display window is currently displaying a menu, and calls the controller member function "scroll_screen_down" on line 21, in the case that the LCD display window is currently displaying information, such as the error log.

The controller member function "displayMenu" provided below, controls display of a menu of information item selections, as shown in FIGS. 4 and 5:

```
1    void controller::displayMenu( )
2    {
3        dspState = MENU;
4        lcd.clear( );
5        for (int i = HARDWARE; i < REMOVABLE_STORAGE; i++)
6        {
```

-continued

```
7         lcd.appendToDisplay (FALSE, menuStrings.getNth (i));
8       }
9       highlt = HARDWARE;
10      lcd.highlight(highlt);
11      top = HARDWARE;
12      bottom = REMOVABLE_STORAGE;
13    }
```

On line 3, displayMenu sets the local data member "dspState" to "MENU" to indicate that the LCD display window is in the MENU state. Next, displayMenu clears the LCD display window on line 4. In the while-loop comprising lines 5-8, displayMenu extracts successive character strings that represent menu items from the local data member "menuStrings" and appends them to the LCD display window. Next, displayMenu sets the local member "highlt" to indicate that the first menu item is highlighted, or marked, and, on line 10, calls the LCD member function "highlight" to highlight, or mark, the first item. Finally, on lines 11-12, displayMenu sets the data members "top" and "bottom" to indicate the line numbers of the first and last lines currently displayed in the LCD display window.

The controller member function "dispatch" provided below, basically dispatches a selection input to an appropriate controller member function for displaying the selected information:

```
1     void controller::dispatch( )
2     {
3       switch (highlt)
4       {
5         HARDWARE:
6           displayHardwareComponents( );
7           break;
8         SOFTWARE:
9           displaySoftwareComponents( );
10          break;
11        ERRORS:
12          displayErrorLog( );
13          break;
14        ACCESS:
15          displayAccessLog( );
16          break;
17        MEMORY:
18          displayMemoryUtilization( );
19          break;
20        STORAGE:
21          displayStorageUtilization( );
22          break;
23        REMOVABLE_STORAGE:
24          displayRemovableStorage( );
25          break;
26      }
27    }
```

The controller member function "dispatch" is simply a large switch-statement comprising lines 3-26, above, that calls an appropriate display function depending on the line number that is currently highlighted, or marked, in the LCD display window. For example, the controller member function "displayErrorLog" is called, on line 13, when the item error log is highlighted, or marked, as shown in FIG. 5.

The controller member function "displayErrorLog" provided below, displays the first initial lines of the error log in the LCD display window:

```
1     void controller::displayErrorLog( )
2     {
3       lMem.store (servMng.fetchErrorLog( ));
4       int maxBottom = lMem.getNumStoredStrings( ) – 1;
5       int maxDisplay = lcd.getMaxDisplayLines( ) – 1;
6       dspState = ERRORS;
7       lcd.clear( );
8       lcd.clearHighlight( );
9       top = 0;
10      if (maxDisplay < maxBottom) maxBottom = maxDisplay;
11      for (bottom =0; bottom <maxBottom; bottom++)
12      {
13        lcd.appendToDisplay (FALSE,
              lMem.getNthString(bottom));
14      }
15    }
```

On line 3, displayErrorLog calls the local memory member function "store" to store the error log entries obtained from the server management bus via a call to the serverManagement member function "fetchErrorLog." Next, on lines 4-5, displayErrorLog sets the local variable "maxBottom" to the maximum possible line number of an error log entry based on the number of lines within local memory, and sets the local variable "maxDisplay" to the line number of the final line that can be displayed on the LCD display window. On line 6, displayErrorLog sets the state of the LCD window to "ERRORS." One lines 7-8, displayErrorLog clears the LCD display window and any highlighting or marking. On line 9, displayErrorLog sets the data member "top" to "0" to indicate the line number of the first displayed line on the LCD display window. On line 10, displayErrorLog sets the local variable "maxBottom" to the lesser of the maximum possible line number based on the contents of local memory and the maximum line number that may be displayed by the LCD display window. Then, in the while-loop comprising lines 11-14, displayErrorLog fetches successive strings from local memory and displays them in the LCD display window, either completely filling the LCD display window, in the case that there are more entries than can be displayed in the LCD display window, and otherwise displays all of the error log entries.

The controller member function "scroll_menu_down," provided below, scrolls highlighting, or marking, of menu items downward in the LCD display window:

```
1     void controller::scroll_menu_down( )
2     {
3       lcd.clearHighlight( );
4       if (highlt == REMOVABLE_STORAGE)
5         highlt = HARDWARE;
6       else highlt++;
7       lcd.highlight(highlt);
8     }
```

On line 3, scroll_menu_down clears any current highlighting, or marking, in the LCD display window. On lines 4-5, scroll_menu_dowri detects whether the final menu item is currently highlighted, or marked and, if so, sets the data member "highlt" to refer to the first item, on line 5. Otherwise, on line 6, scroll_menu_down simply increments the data member "highlt" in order to place highlighting, or marking, on the next line after the line that was currently highlighted or marked. Finally, on line 7, scroll_menu_down calls the LCD member function "highlight" to highlight the line indicated by the current contents of the data member "highlt." The controller member function "scroll_menu_up," provided below, scrolls highlighting upward in the LCD display window, and is analogous to the previously described controller member function "scroll_menu_down:"

```
1    void controller::scroll_menu_up( )
2    {
3        lcd.clearHighlight( );
4        if (highlt == HARDWARE)
5            highlt = REMOVABLE_STORAGE;
6        else highlt--;
7        lcd.highlight(highlt);
8    }
```

The controller member function "scroll_screen_down," provided below scrolls the display contents of the LCD display window downward in the case that the LCD display window is displaying information such as the error log:

```
1    void controller::scroll_screen_down( )
2    {
3        int numDown = lcd.getNumScrollDowns( );
4        int maxBottom = lMem.getNumStoredStrings( ) – 1;
5
6        while (bottom < maxBottom && numDown > 0)
7        {
8            bottom++;
9            top++;
10           lcd.appendToDisplay (FALSE,
                 lMem.getNthString(bottom));
11           numDown--;
12       }
13   }
```

On line 3, scroll_screen_down sets the local variable "numDown" to the number of times the down arrow pushbutton (323 in FIG. 3) has been depressed since the last interrupt was generated by the LCD display window interface. On line 4, scroll_screen_down sets the local variable "maxbotton" to the maximum line number of an error log entry. Then, in the while-loop comprising lines 6-12, scroll_screen_down appends successive error log entries to the LCD display device, in each iteration incrementing the data members "bottom" and "top" to indicate the line numbers of the first and last lines currently displayed by the LCD display window, and decrements the local variable "numDown" to indicate that another down-arrow pushbutton activation has been handled. This loop continues either until the final entry in the error log is displayed, or until all activations of the down arrow pushbutton have been handled, as indicated in the test for while-loop continuation on line 6. The controller member function "scroll_screen_up," provided below, scrolls the contents of the LCD display window upward, analogously to the previously described function:

```
void controller::scroll_screen_up( )
{
    int numUp = lcd.getNumScrollUps( );
    while (top > 0 && numUp > 0)
    {
        bottom--;
        top--;
        lcd.appendToDisplay (TRUE, lMem.getNthString(top));
        numUp--;
    }
}
```

The controller constructor, provided below, initializes the contents of the data member "menuStrings" and calls the member function "displayServerId" to display the server ID on the LCD window:

```
void controller::controller( )
{
    menuStrings.addString("hardware components");
    menuStrings.addString("software components");
    menuStrings.addString("error log");
    menuStrings.addString("access log");
    menuStrings.addString("memory utilization");
    menuStrings.addString("mass storage utilization");
    menuStrings.addString("removable storage titles");
    void displayServerId( );
}
```

Thus, the above-provided pseudo-code implementation describes, in part, functionality residing within the subsystem controller (710 in FIG. 7) to control display of information to the LCD display window. In general, functionality residing within the class "controller" can be thought of as representing software routines that execute on a micro-controller within the subsystem controller. Functionality residing within the hardware circuitry of the subsystem controller, buses, and interfaces to the server processor and the LCD display window devices can be considered to reside in the classes "lcd" and "serverManagement." However, partitioning of functionality between software and hardware is somewhat arbitrary. Most of the functionality described in the above pseudo-code could be implemented in hardware, and most of the functionality could be implemented as software routines running on a micro-controller. In between these two extremes, there is almost a limitless number of possible partitionings between hardware and software. As an illustration of the flexibility possible in the interface between hardware and software, consider an alternate declaration of the class "LCD," provided below:

```
1    class LCD //alternate LCD
2    {
3        int     getMaxDisplayLines( );
4        void    displayLine (int lineNo, String & str);
5        void    clear( );
6        void    highlight(int line);
7        void    clearHighlight( );
8        int     getNumScrollUps( );
9        int     getNumScrollDowns( );
10       LCD(void (*interruptHandler)(LCD_INTERRUPT));
11       ~LCD( );
12   }
```

This alternative declaration includes a change in the functionality for displaying lines on the LCD display window. In place of the previously declared member function "appendToDisplay," an alternative display function "displayLine" is provided on line 4, above. This alternative display function is less capable than the previously described member function "appendToDisplay." The member function "displayLine" simply displays a character string, supplied as argument "str," at the line of the LCD display window indicated by the argument "lineNo." Thus, displayLine does not automatically scroll the contents of the LCD display window in conjunction with appending a line of text to the top or bottom of the LCD display window, as provided by the previous LCD member function "appendToDisplay." Thus, this alternate declaration of the class "LCD" corresponds to moving the partitioning between hardware and software functionality further towards the software side, since the software routines running on the micro-controller will require more complex functionality to make up for the decreased functionality of the member function "displayLine."

An alternate version of the controller member function "scroll_screen_down" is provided below to illustrate the increased functionality required in this software routine as a result of substituting the member function "displayLine" for the LCD member function "appendToDisplay:"

```
void controller::scroll_screen_down( ) //alternate scroll_screen_down( )
{
    int numDown = lcd.getNumScrollDowns( );
    int maxBottom = lMem.getNumStoredStrings( ) – 1;
    if (bottom < maxBottom)
    {
        bottom += numDown;
        if (bottom > maxBottom) bottom = maxBottom;
        top = bottom – lcd.getNumScrollDowns( ) + 1),
        for (int i = top, int j = 0; i <= bottom; i++, j++)
        {
            lcd.displayLine (j, lMem.getNthString(i));
        }
    }
}
```

The alternate version of scroll_screen_down computes local variables "numdown" and "maxbottom" on lines 3-4, as in the previous version of scroll_screen_down. However, the remaining functionality is somewhat less efficient than the corresponding functionality of the previous version of scroll_screen_down. As one example, even if only a single scroll down action has occurred, indicated by local variable "numdown" containing the value "1," the LCD member function "displayLine" must still be called a number of times equal to the number of lines that can be displayed concurrently on the LCD display window. This is because, as mentioned above, LCD member function "displayLine" does not automatically scroll the current contents of the LCD display window.

Figure 8:
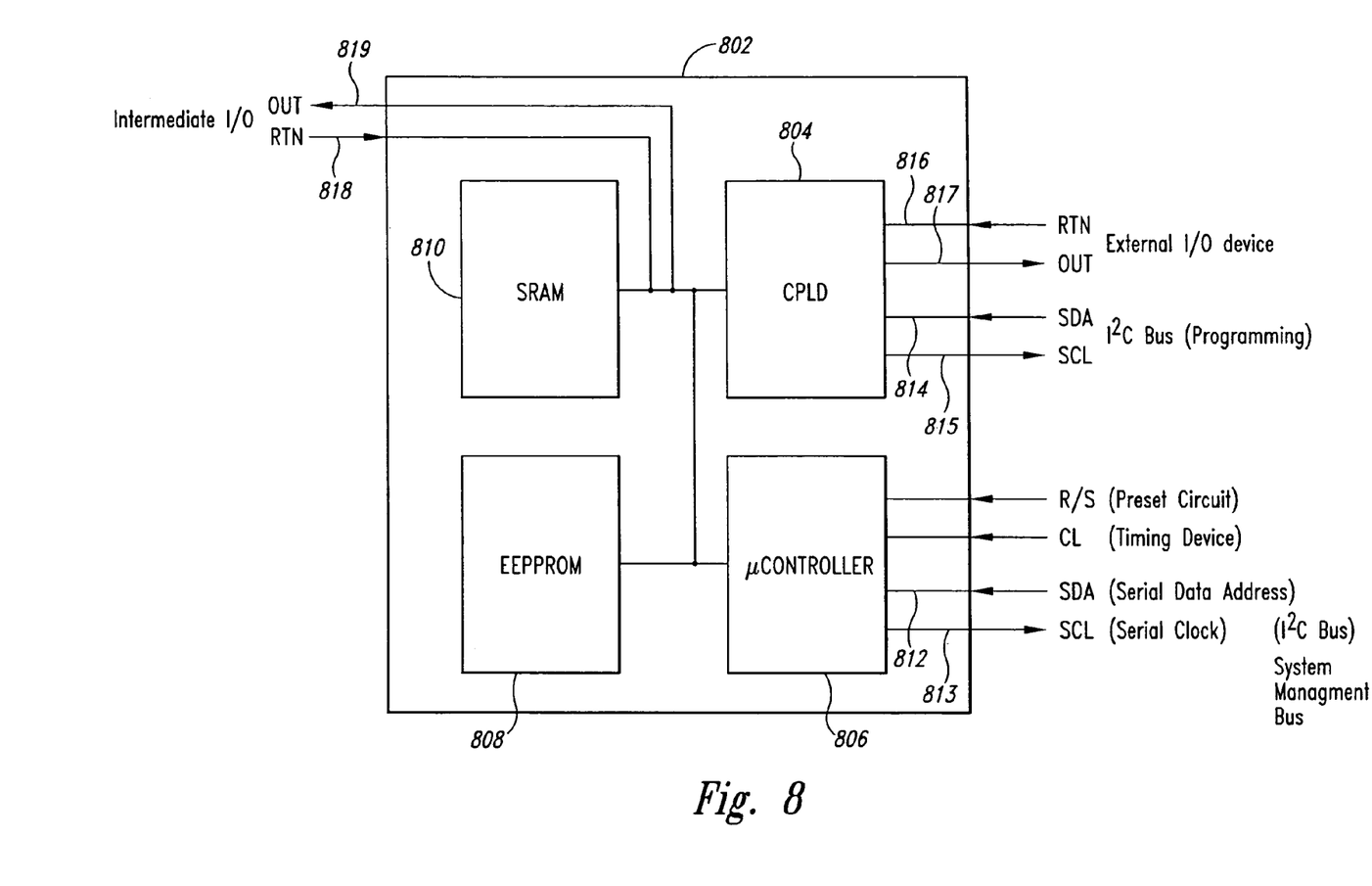
FIG. 8 is a block diagram of the single IC subsystem controller of the described embodiment of the present invention.

FIG. 8 is a block diagram of the single IC subsystem controller of the described embodiment of the present invention. The IC 802 comprises a CPLD 804, a micro-controller 806, an EEPROM 808, and a SRAM 810. In a preferred embodiment, the micro-controller 806 is selected from among the Phillips Semiconductor 80CL410 family of micro-controllers.

CPLDs generally consist of multiple PLA-like logic blocks interconnected to together via a programmable switch matrix. Typically, each logic block contains 4 to 16 macrocells. In a preferred embodiment, the CPLD is selected from the Phillips Semiconductor PZ5064 series of CPLDs. Both the micro-controller 806 and CPLD 804 interface to an I²C bus (812-813 and 814-815, respectively). Both the micro-controller and the CPLD may be programmed via input from the I²C bus. In addition, the micro-controller receives data from other system components via the I²C bus for display on the LCD display window. The CPLD interfaces to an 8-bit I/O bus (816-817), and both the CPLD and micro-controller interfaced to an intermediate I/O bus (818-819).

Although the present invention has been described in terms of a particular embodiment, it is not intended that the invention be limited to this embodiment. Modifications within the spirit of the invention will be apparent to those skilled in the art. For example, as discussed above, the single-IC subsystem controller device can be programmed to control any number of different electronic devices and subsystems. Any number of different partitionings of control functionality between object circuits, programmed into the CPLD, and software routines, executed by the micro-controller are possible. The single-IC subsystem controller device may include a variety of different interfaces that allow the single-IC subsystem controller device to interface with various electronic system components. In the embodiment discussed above, an I²C bus that is externally accessible is included as an interface for programming both the CPLD and for storing programs within the single-IC subsystem controller device for execution by the micro-controller. There are an almost limitless number of different possible logic circuits and software implementations for controlling any particular electronic device or subsystem.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

The invention claimed is:

1. A subsystem controller implemented as a single integrated circuit for control of a device or subsystem within an electronic system having system processing components, the subsystem controller comprising:
   a complex programmable logic device that can be programmed to provide logic circuits that implement control functionality;
   a micro-controller that can execute software routines that implement control functionality;
   read-only memory that stores executable code for execution by the micro-controller;
   random-access memory that can store data and executable code for execution by the micro-controller;
   a bus interface for exchanging data and control signals between the subsystem controller and system processing components; and
   an additional electronic interface to a device or subsystem controlled by the subsystem controller.

2. The subsystem controller of claim 1 wherein control functionality of the subsystem controller is partitioned between logic circuits programmed into the complex programmable logic device and software routines executed by the micro-controller.

3. The subsystem controller of claim 1 programmed to control liquid display of information on a liquid-crystal display window included in an external front panel display of a server computer.

4. The subsystem controller of claim 1 wherein the bus interface is an inter-integrated circuit bus interface.

5. The subsystem controller of claim 1 wherein the additional electronic interface is an 8-bit input/output bus and additional signal lines.

6. A method for controlling a subsystem within a complex electrical device, the method comprising:
provides a single-integrated-circuit subsystem controller;
programming control functionality into the single-integrated-circuit subsystem controller by
programming logic circuits into a complex programmable logic device included in the single-integrated-circuit subsystem controller,
implementing software routines for execution by a micro-controller within the single-integrated-circuit controller, and
storing the software routines in the single-integrated-circuit subsystem controller; and
interconnecting the single-integrated-circuit subsystem controller to the subsystem within the complex electrical device.

7. The method of claim 6 wherein the subsystem is a liquid-crystal display window that displays information about the components within the complex electrical device and about the state of the complex electrical device.

8. The method of claim 6 wherein the complex electrical device is a computer system.

9. The method of claim 6 wherein the single-integrated-circuit subsystem controller includes the complex programmable logic device, the micro-controller, a read-only memory, a random-access memory, a bus interface, and an additional electronic interface.

10. The method of claim 9 wherein interconnecting the single-integrated-circuit subsystem controller to the subsystem within the complex electrical device further includes interconnecting the subsystem with the additional electronic interface.

* * * * *

UNITED STATES PATENT AND TRADEMARK OFFICE
CERTIFICATE OF CORRECTION

| | | |
|---|---|---|
| PATENT NO. | : 7,409,531 B1 | Page 1 of 1 |
| APPLICATION NO. | : 09/430192 | |
| DATED | : August 5, 2008 | |
| INVENTOR(S) | : Michael B. Raynham et al. | |

It is certified that error appears in the above-identified patent and that said Letters Patent is hereby corrected as shown below:

On the Title page, Item (54), in column 1, in "Title", line 2, after "PROGRAMMABLE" insert -- LOGIC --.

In column 1, line 2, after "PROGRAMMABLE" insert -- LOGIC --.

In column 9, line 12, delete "~LCD" and insert -- LCD --, therefor.

In column 9, line 13, delete "LCD" and insert -- ~LCD --, therefor.

In column 14, line 59, delete "dowri" and insert -- down --, therefor.

Signed and Sealed this

Eleventh Day of November, 2008

JON W. DUDAS
*Director of the United States Patent and Trademark Office*